United States Patent [19]
Smith, Sr. et al.

[11] Patent Number: 5,268,698
[45] Date of Patent: Dec. 7, 1993

[54] TARGET ACQUISITION, LOCATING AND TRACKING SYSTEM

[76] Inventors: Louis P. Smith, Sr., 21325 Scivicque Rd., Denham Springs, La. 70726; Louis P. Smith, Jr., 16034 Manchester Ave., Apt. 4A, Baton Rouge, La. 70816; Harry D. Ritch, 104 Cedar Ridge Rd., Bay St. Louis, Miss. 39520

[21] Appl. No.: 923,848

[22] Filed: Jul. 31, 1992

[51] Int. Cl.5 .................. G01S 3/02; G08B 13/18; G06F 15/48
[52] U.S. Cl. .................. 342/450; 342/454; 342/457; 342/463; 340/552; 364/439
[58] Field of Search ........... 342/450, 454, 456, 457, 342/463, 27, 451; 364/439; 367/124; 340/552, 553

[56] References Cited

U.S. PATENT DOCUMENTS

| | | | |
|---|---|---|---|
| 2,660,718 | 11/1953 | Summerhayes, Jr. et al. | 342/27 |
| 3,300,768 | 1/1967 | Bystrom et al. | 340/552 |
| 3,706,969 | 12/1972 | Paredes | 340/26 |
| 4,151,595 | 4/1979 | Pressiat | 364/439 |
| 4,163,283 | 7/1979 | Darby | 364/439 |
| 4,197,536 | 4/1980 | Levine | 343/5 LS |
| 4,319,243 | 3/1982 | Vachenauer | 343/6.5 |
| 4,418,349 | 11/1983 | Hofgen | 343/6.5 |
| 4,481,516 | 11/1984 | Michelotti | 340/933 |
| 4,553,135 | 11/1985 | Grynberg et al. | 340/564 |
| 4,760,381 | 7/1988 | Haag | 340/556 |
| 4,845,629 | 7/1989 | Murga | 364/439 |
| 4,989,084 | 1/1991 | Wetzel | 358/108 |
| 5,027,114 | 6/1991 | Kawashima et al. | 340/941 |

Primary Examiner—Gregory C. Issing
Attorney, Agent, or Firm—David L. Ray

[57] ABSTRACT

In accordance with the present invention there is provided a monitoring system that monitors and locates objects such as airplanes and other vehicles on runways, taxiways, or other preprogrammed areas. The invention utilizes a minimum of three transmitters for generating a diffusion field and two receivers which detect displacements in a diffusion field. The receivers are coupled with a computer which calculates the position of the object causing the displacement in the diffusion field. The area to be monitored is divided into grids which are programmed onto the computer, and objects moving in the monitored area cause changes in the signal received by the receivers which are conveyed to the computer and compared by the computer to the programmed grid to indicate the location of the object causing the changes.

11 Claims, 5 Drawing Sheets

TARGET ACQUISITION, LOCATING AND TRACKING SYSTEM

BACKGROUND OF THE INVENTION

1. Field of the Invention

The invention relates to locating the position of a moving object. In particular, the present invention relates to acquiring, locating, and tracking single or multiple objects moving over a planar surface day or night regardless of weather conditions. More particularly, the invention relates to monitoring the movement or encroachment of an object onto an aircraft runway or taxiway.

2. Description of the Related Art

Tracking and locating aircraft and other moving vehicles on airport runways and taxiways is difficult when weather conditions are ideal. Tracking and guiding aircraft over runways and taxiways is usually accomplished by a flight controller visually sighting and visually tracking the taxiing aircraft, and directing the movement of the aircraft by voice commands to the aircraft from the flight controller. When weather conditions such as rain, snow, fog, smog, or dust obscure the flight controller's view of an airport's runways and taxiways, the airport is usually closed causing inconvenient and expensive delays to the airlines and passengers.

Systems for monitoring the movement of airplanes and other objects over the surface an airport runway or taxiway are known in the art. Exemplary of such systems are the following U.S. Patents:

U.S. Pat. No. 5,027,114 discloses a ground guidance system for airplanes in which loop coils of a predetermined shape are continuously buried in a specific section of a taxiway for airplanes, an airplane is continuously detected based on changes of self-inductances of the loop coils with movement of the airplane while discriminating airplanes from other objects and admission or inhibition of advance in the specific section to a subsequent airplane according to the presence or absence of the airplane in the specific section and which has a fail-safe structure not generating an output at the time of a system or circuit failure or accident.

U.S. Pat. No. 4,989,084 discloses a airport runway monitoring system which is for monitoring and recording the movement of aircraft and their external characteristics and paths during and after landing and take-off from an airport runway detects malfunctions, pilot error, equipment failure or other evidence that might assist in determining the cause of a crash or other malfunction. The system includes a plurality of video cameras located adjacent to the runway, a video recording device for saving information from the cameras, and a video transmission device connecting the cameras to the recording device.

U.S. Pat. No. 4,845,629 discloses an airport surveillance system which is a system for surveillance, guidance and fire fighting in airports. The system is arranged to monitor the position of aircraft in the taxiway, parking areas and flight lanes and in the event of an accident in the flight lane to extinguish any fires caused thereby. Infrared sensors are arranged along the flight lanes and their output signals are processed by a computer to provide information concerning the aircraft movements along the flight lanes. In the event of an emergency the computer processes the output signals from the sensors to determine the precise location and area of any heat sources in the flight lane and causes hydrants to direct fire-extinguishing fluid at the heat sources. Position detectors are provided for detecting the position of aircraft in the taxiway and parking areas. The output signals from the position detectors are processed by a computer to determine the position of the aircraft and the output of the computer is arranged successively to illuminated beacons to guide the aircraft along a selected route.

U.S. Pat. No. 4,418,349 discloses an airport surveillance system located adjacent to runways, taxiway, and approach ramps are secondary radar interrogators which radiate the P1 and P3 pulses and the P2 pulse via different directional patterns into sectors to be monitored which are individually assigned to each interrogator. Direction finders at different locations determine the directions of arrival of SSR reply signals radiated by an airborne SSR transponder in a sector to be monitored. From the directions of arrival and the locations of the direction finders, the respective transponder position is determined. The interrogators require no central control. Alternatively, the arrival times of the SSR reply signals are measured at several points; an evaluating device forms the differences in arrival time, and the intersection of the hyperbolic lines of position determined in the evaluating device is the position of the transponder.

U.S. Pat. No. 4,197,536 discloses an airport surface identification and control system for aircraft equipped with ATCRBS and ILS, an identification and surface guidance system including a plurality of detection positions each including an interrogator and an auxiliary transponder located adjacent the runway and on opposite sides thereof, respectively. The interrogator is enable through a signal cable from a remote location, such as a control tower, to produce the first of the discretely spaced pulse pair required to interrogate the ATCRBS equipment. The second interrogation pulse of the pair is generated by the transponder, which is activated by the radiated first pulse from the interrogator and includes an internal delay, such that this delay plus the transit time from the transponder serves to generate the second pulse of the pair if the aircraft to be interrogated is in the vicinity and on the pathway centerline or within a specified lateral tolerance therefrom. The ATCRBS reply may be received directly at the control tower or may be transmitted by cable from receiving equipment within the interrogator. ATCRBS decoding and display equipment may, be employed at the control tower for discrete identification of a give aircraft. The identification points are distributed along a runway, taxiway or other surface area of an airport for continuing identification. Time discrimination apparatus compares the ATCRBS pulse train received by the transponder and retransmitted therefrom to the interrogator to that received directly by the interrogator to generate a signal representative of the aircraft deviation from pathway centerline, and this signal is transmitted on an unused ILS channel to the aircraft for presentation to the pilot on the localizer cross pointer indicator within the aircraft.

U.S. Pat. No. 4,319,243 discloses an airport-surveillance system for determining the position and identification of aircraft (4) on the airfield which utilized secondary radar and includes an interrogation station (1) installed on the airfield (3) and from which the interrogation signal is transmitted by way of a narrow sharply focused beam of an antenna which scans the airfield and further includes transponding stations installed in the aircraft (4). The present invention provides accurate identification and location of the aircraft by utilizing a receiver which has a sharply focused antenna beam and which is geographically located a distance away from the interrogation antenna and wherein the replies from the transponder of the aircraft are received by the receiving antenna only when the interrogation and receiving antenna beams (2, 22) intersect. By scanning all locations of the airport, the position and identification of all aircraft on the airport can be determined. A modification of the invention provides that instead of or in addition to the receiving station having a narrow beam antenna a number of receivers (5,6 and 7) having amniidirectional receiving antennas can be mounted at different locations on the airfield for determining the aircraft positions by using hyperbola locating techniques. The airport surveillance system of the invention is particularly suitable for large airports.

U.S. Pat. No. 4,163,283 discloses an automatic method to identify aircraft types with two sensors spaced at a known separation produce signal pulses when activated by the wheels of a taxiing aircraft. The signals are transmitted to a processor in which the wheelbase of the aircraft can readily be calculated. Since specific aircraft types have unique wheelbase dimensions and characteristics, the type of aircraft passing the sensors is determined in a processor. Also, the time, direction, and speed of the aircraft can be determined and logged by the processor.

U.S. Pat. No. 4,151,595 discloses a system for controlling ground movements on runways and taxiway to be guided and a corresponding ground traffic to be controlled. The system includes sensors for detecting pressure variations and which are distributed at known intervals along the routes, each sensor having four linear arms arranged in pairs on both sides of the axis of the route in such a way that the items of data corresponding to the respective times at which the lateral wheels of the aircraft cross them enable, by means of a simple calculation performed by electronic processing of the detected signals, guidance and control instructions to be produced which include: heading deviation, speed together with its direction, and lateral deviation and in addition, instructions or orders such as changes of heading, changes of speed, emergency stops and runway turn offs.

U.S. Pat. No. 3,706,969 discloses an airport ground aircraft automatic taxi route selecting and traffic control system. As an identified object, such as an aircraft on the ground is scheduled to cross the surface traffic network of certain areas, such as an airport, its identification and point of destination on the ground are fed to an automatic digital computerized controller including integrated intersection traffic control and monitoring logic units, which automatically generates a selected route from the point of origin of the object to such destination point, and by appropriate guidance displays including such identification, directs the pilot or driver of the object at each traffic intersection when safely to enter and in which direction to proceed, until the object reaches the desired destination point.

SUMMARY OF THE INVENTION

In accordance with the present invention there is provided a monitoring system that monitors and locates objects such as airplanes and other vehicles on runways, taxiways, or other preprogrammed areas. The invention utilizes a minimum of three transmitters for generating a diffusion field and two receivers which detect displacements in a diffusion field. The receivers are coupled with a computer which calculates the position of the object causing the displacement in the diffusion field. The area to be monitored is divided into grids which are programmed onto the computer, and objects moving in the monitored area cause changes in the signal received by the receivers which are conveyed to the computer and compared by the computer to the programmed grid to indicate the location of the object causing the changes.

The system of the invention provides a greatly improved degree of safety at airports and the increases the ease air traffic controllers in locating stationary aircraft and other objects, and tracking taxiing aircraft and other moving objects.

The system of the invention will operate effectively in weather conditions such as rain, snow, fog, smog, or dust which might obscure the flight controller's view of an airport's runways and taxiways.

This system of the invention will allow a controlled access to the runways and taxiway preventing any accidents from occurring by the constant updating of the information received from the receivers located at crucial locations throughout the airport areas.

The system of the invention will allow handling of more aircraft with greater safety due to the fact that every section of the field is constantly being monitored.

The system of the invention can include both audio and visual alarms when two tracked objects come within a preset distance of each other.

Furthermore, an alarm can be incorporated into the system of the invention to warn traffic controllers of impending critical or life endangering traffic situations.

The invention is set to monitor the location of an aircraft from the time the plane touches the runway to the time the aircraft clears the field. Therefore, whenever the aircraft is located on the taxiway or runways the craft is under constant surveillance.

The system of the invention also can be utilized to monitor and locate moving objects such as persons or vehicles in penal institutions, secured areas such as military bases, office buildings, residences, parks, warehouses and the like, and traffic control areas such as entrance and exits driveways to buildings or other facilities.

DESCRIPTION OF THE PREFERRED EMBODIMENTS

Figure 1:
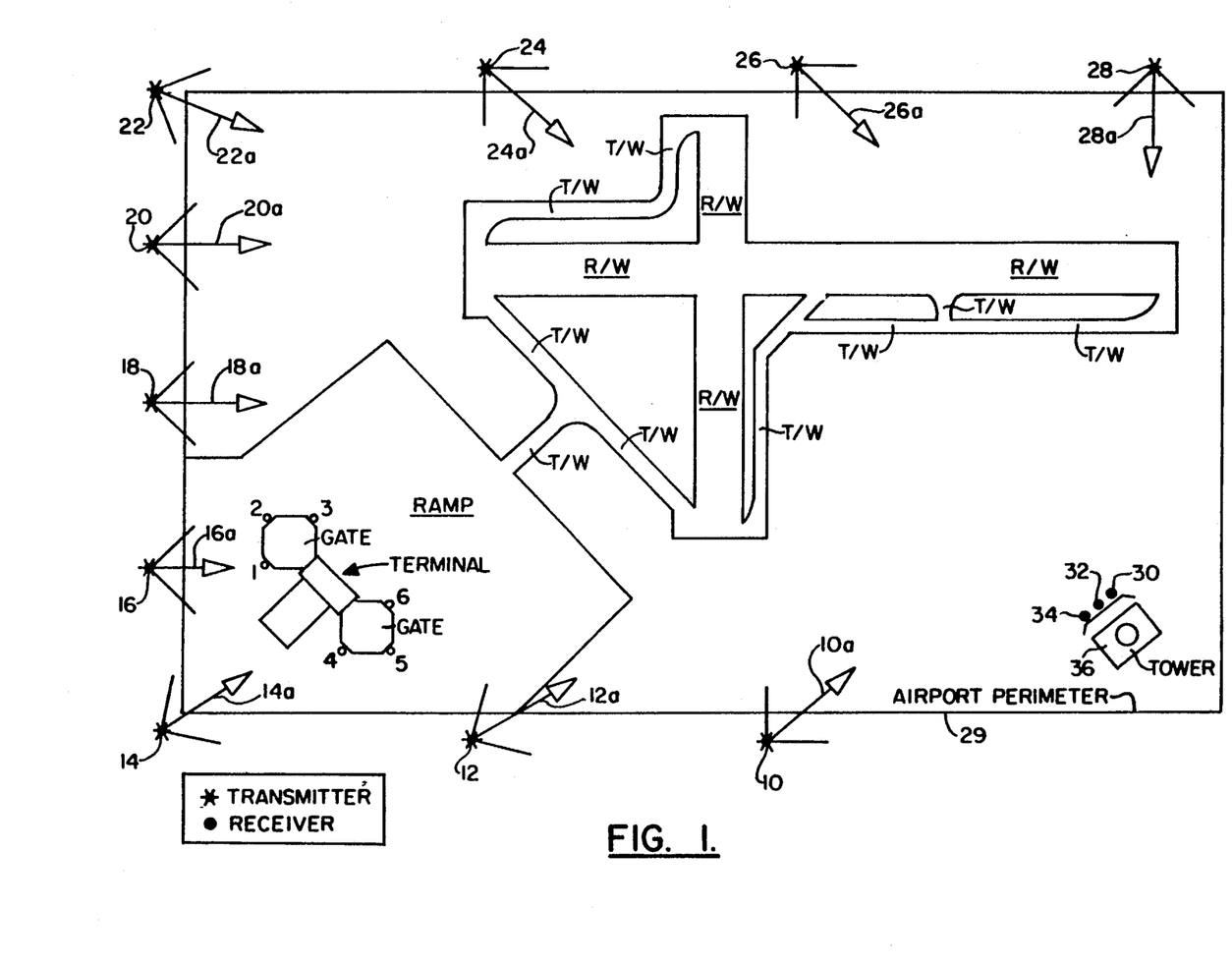
FIG. 1 is a schematic top view of a conventional airport having the monitoring system of the present invention installed thereon.

Referring now to the drawings, and in particular to FIG. 1, the system of the invention is shown installed at a typical airport. The airport has a plurality of runways designated "R/W" interconnected to a plurality of taxiways designated "T/W".

Furthermore, the airport depicted in FIG. 1 has a conventional ramp adjacent to a taxiway designated "RAMP" on FIG. 1 which aircraft traverse to reach a typical terminal designated "TERMINAL" on FIG. 1. The TERMINAL has two gates designated "GATE" on FIG. 1 where passengers and cargo board aircraft, one gate having entrance gates designated 1, 2, and 3, and the other gate having entrance gates designated 4, 5, and 6. Furthermore, the airport of FIG. 1 has a conventional control tower designated "TOWER".

As shown, a plurality of transmitters 10, 12, 14, 16, 18, 20, 22, 24, and 28 are placed along the outside perimeter 29 of the area to be monitored and aligned to transmit signals toward the runways R/W, taxiways T/W, and Ramp to be monitored in the direction indicated by the arrows 10a, 12a, 14a, 16a, 18a, 20a, 22a, 24a, 26a, and 28a. However, if desired, a minimum of three transmitters could be placed in a line on one side of the area to be monitored, and two receivers could be place on the other side of the area to be monitored, provided that each receiver is located so that it can receive signals from each transmitter. At least two receivers must be located to receive diffusion signals from at least three transmitters to triangulate the location of the object moving across the area being monitored. Triangulation calculations are performed by the computer 50 to arrive at the exact location of the object (such as an aircraft) on the area being monitored.

Figure 2:
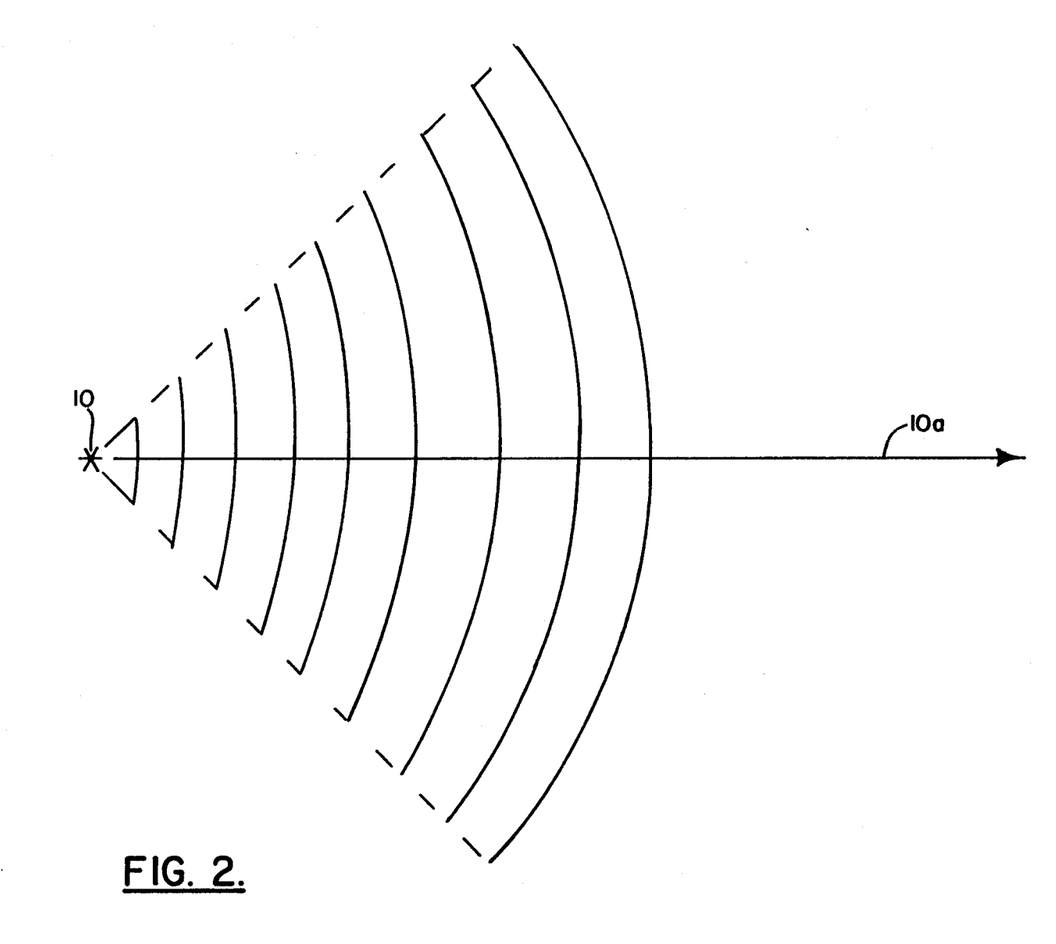
FIG. 2 is a schematic view of a transmitter wave pattern.

Furthermore, each transmitter 10-28 should be located to allow for overlap coverage by the wave pattern shown in FIG. 2 and will be adjusted for each airport or other area to be monitored to allow for saturation of the monitored area. Overlap is necessary to insure the entire desired area is being monitored.

The signals transmitted by each transmitter 10, 12, 14, 16, 18, 20, 22, 24, 26, and 28 have a diffusion pattern identical to the diffusion pattern shown in FIG. 2 for transmitter 10. By the term transmitter is meant any device which emits a signal that can be detected and measured. Preferred transmitters that may be used are sonic and ultra sonic transmitters, plasma source transmitters, ultra violet (high intensity) light transmitters, and microwave (shotgun type) transmitters.

The wavelength of the signals transmitted by transmitters 10-28 ranges from about 2000 angstroms to about three meters. Preferably, the wavelength of the signals ranges from about 10 centimeters to about one meter.

As can be seen in FIG. 1, three receivers 30, 32, and 34 are located within the perimeter 29 of the airport for receiving signals generated by the transmitters 12-28. Exemplary of the receivers that may be used are ultra sonic, plasma based, light emitting ultra violet, pulsed sensor, or any combination of the above units. The terrain and location will dictate the type of transmitter and receiver.

In FIG. 1, three receivers 30, 32, and 34 are shown located near the airfield control tower 36. A minimum of two receivers may be used if desired, although three are preferred. At least two receivers must be employed to give the digital computer two different, distinct signals to compare against an established grid system which will be described in greater detail below.

The receivers 30, 32, and 34 must be installed in a location which will allow unobstructed receipt of signals generated by transmitters 12-28, i.e., the three receivers 30, 32, and 34 must be installed in a location which will allow an unobstructed view of the area monitored such as the airport runways and taxiways shown in FIG. 1 when no aircraft or other vehicles are located thereon. The receivers 30, 32, and 34 must be placed and aimed so that a taxiing aircraft or other vehicle traveling over the runways or taxiways of the airport will interrupt the straight line of travel of some of the signals transmitted from transmitters 12-28 to receivers 30, 32, and 34, and thus cause some of the signals transmitted from transmitters 12-28 to diffuse around an aircraft or other object prior to being received by receivers 30, 32, and 34. Although location of the receivers 30, 32, and 34 by the airfield control tower 36 is a preferred location, the receivers 30, 32, and 34 may be located in other places within the perimeter 29 of the airport if desired.

Figure 3:
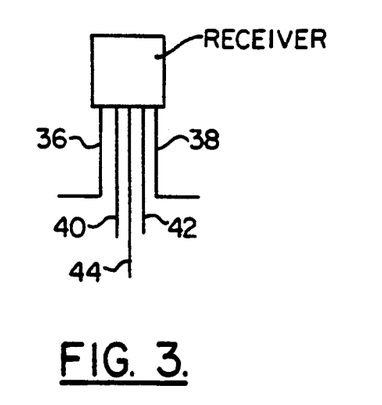
FIG. 3 is a schematic view of a receiver.

In FIG. 3 is shown a schematic view of a typical receiver 30, 32, or 34 which is labeled RECEIVER in FIG. 3. As shown in FIG. 3, each receiver 30, 32, and 34 has a positive voltage input 36 and a negative voltage input 38, an input lead 40 and an output lead 42, and a reference lead 44. When activated receivers 30, 32, and 34 will receive and read the signals generated by transmitters 12-28 and provide a signal to the digital computer for processing. signals generated by some of the wavelength transmitters 12-28 will diffuse around the object and cause a change in the signals being received by receivers 30, 32, and 34.

When transmitters 12-28 are installed at an airport or other location, the transmitters must be adjusted to produce the desired wave pattern for the specific location. The wave pattern is fixed to provide a diffusion pattern in the desired location, which in FIG. 1, is the taxiways and runways and ramp of the airport. The wave pattern to be fixed may be calculated as follows:

$$r = 10000$$
$$c = .000001$$
$$\tau = \frac{1}{r \cdot c}$$
$$t = 0 \text{ to } 500 \text{ seconds}$$
$$x_t = e^{-\frac{t}{\tau}}$$
$$y_t = x_t \cdot \sin(188 \cdot t)$$

r = distance of transmitter from closest portion of area to be monitored, t = time, and c = width of cone of the signal generated by the transmitter at the closest perimeter of the area to be monitored. The width "c" of the cone of a given transmitter overlaps the width "c" of the cone of an adjacent transmitter at the perimeter of the area to be monitored. This perimeter is commonly selected to be approximately ten feet from the edge of the runway or taxiway, which is the approximate distance of lights from most runways and taxiways. This calculation is a simple basic form of arriving at a broadcast cone for a transmitter to broadcast to the receiver. The inherent pattern is a cone shape which can be varied by adjusting the given values of c, r, and t. The overlap of the transmitter signals achieved through calculations of the widths "c" selected in accordance with the above procedure can be confirmed in the field with the use of handheld field intensity measuring devices which are well known in the art.

Figure 4:
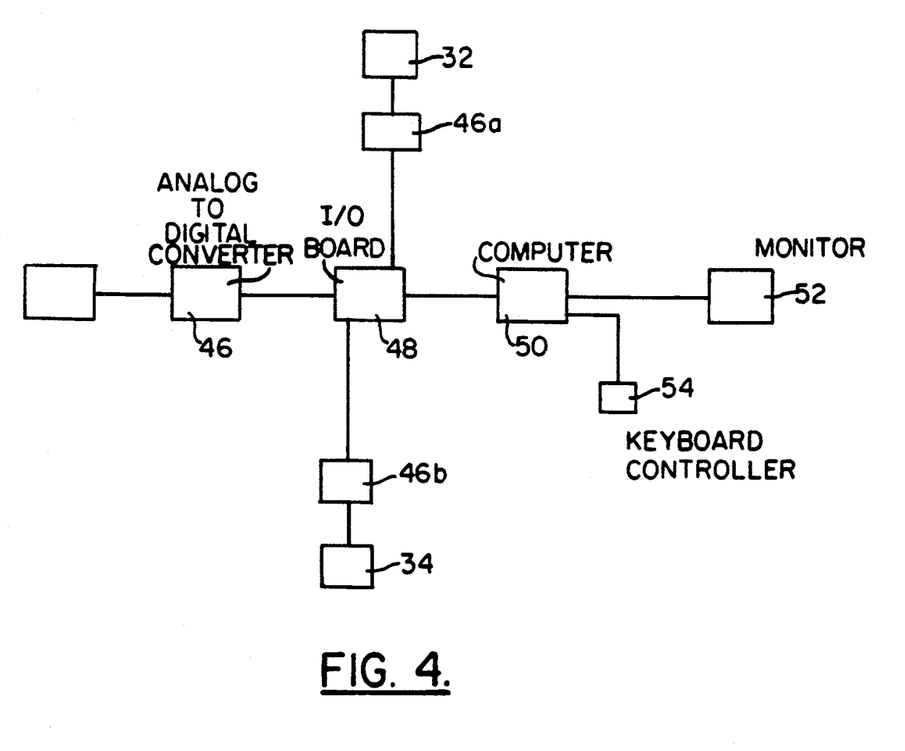
FIG. 4 is a block diagram of the receiver and computer circuitry.

As shown in FIG. 4, receivers 30, 32, and 34 are connected to a conventional analog to digital converters 46, 46a and 46b, respectively, which convert the analog signals from receivers 30, 32, and 34 to digital signals. The digitized signals from receivers 30, 32, and 34 are conveyed to an input/output board 48. The input/output board 48 is a basic unit using digital/TTL(-transistor/transistor logic) to transform analog signals received by the receivers 30, 32, and 34 to digitize signals to be processed by the digital computer 50.

The output signal from the input/output board 48 is conveyed to conventional digital computer 50 for final processing before being relayed to conventional monitor 52 for viewing. Based on programming installed, personnel will have a selection of responses to the information displayed on monitor 50. Digital computer 50 has a conventional keyboard controller 54 shown in FIG. 4.

Figure 5:
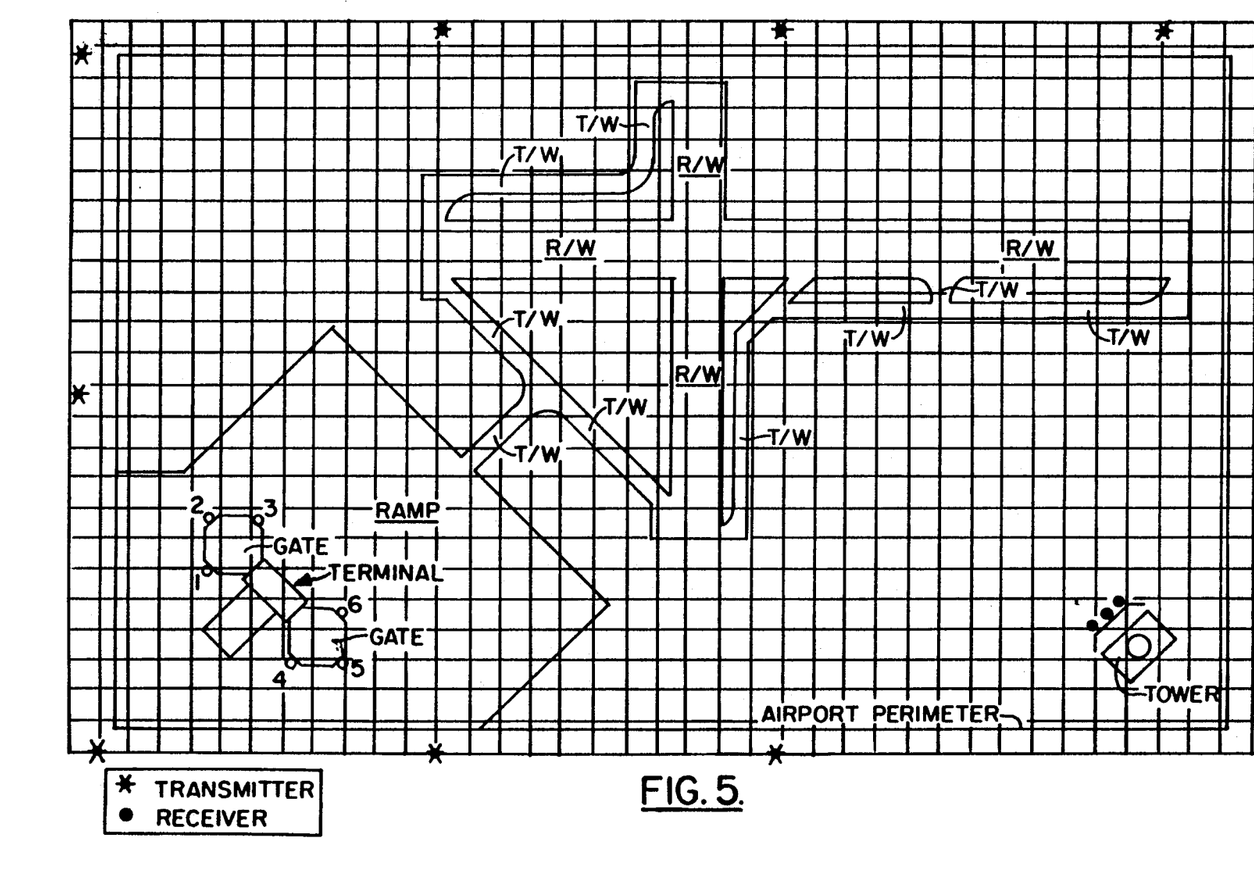
FIG. 5 is a schematic view of a grid system applied to the airport of FIG. 5.

A grid system shown in FIG. 5 is programmed into computer 50 as follows: On a field with all movable objects removed, so that the field integrity is at 0, the transmitters 12-28 are activated and the values received by the receivers 30, 32, and 34 are conveyed to computer 50 and placed in memory. These values correspond to an unoccupied field.

The area to be monitored is then disturbed by placing an object at known locations on the area to be monitored. The signals received by the receivers 30, 32, and 34 will be changed and the values will be conveyed to the computer and assigned a code corresponding to the location of the object placed on the area to be monitored. This procedure is repeated for the entire area to be monitored to establish a grid corresponding to the grid shown in FIG. 5.

Thus any variance in the field caused by any new object placed on the area to be monitored will show as an obstacle on the grid or movement thereon, and in case of an object located on the grid, there will be a constant indication of the location and movement of the object on the grid. Warnings or alarms can be activated by movement or location of objects in undesired areas until the object is either removed or approved by the operator observing the grid.

The field or area to be monitored dictates the location of the transmitters and receivers to achieve total vision on and unobstructed view of all parts of the airport or other area to be monitored.

Figure 6:
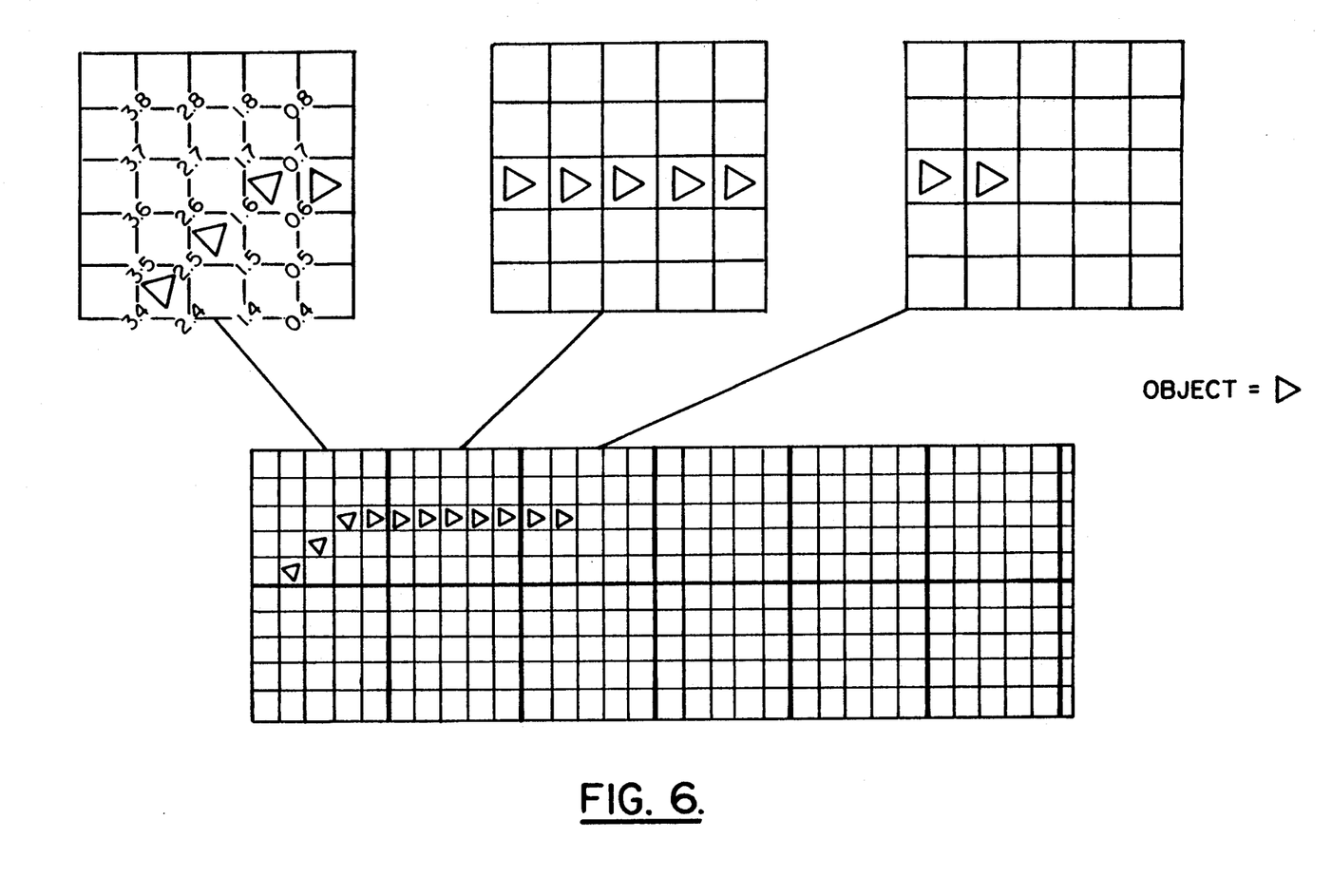
FIG. 6 is a schematic view of the reaction of a grid to an object moving across the grid.

As shown in FIG. 6, an object designated by the triangle on FIG. 6 entering the airport will cause the values to change at the location of the aircraft on the grid. Computer 50 compares the new values to the values of the various locations on the grid when no object is on the airport. The points on the grid which differ indicate the location of the object on the grid. Size of the object can also be determined by the the number of grid locations disturbed.

As the object moves along the airport, the values on the grid will also continue to change allowing the computer 50 to track the moving object. Due to the increased speed of state of the art computers, these changes will be reflected almost instantaneously to the computer monitor, allowing the user to visually observe the exact location and movement of the object, and act on this information.

The system of the invention will allow full monitoring of runways and taxiways for movement or encroachment by an aircraft, vehicle, person, animal, or other object.

Although the preferred embodiments of the invention have been described in detail above, it should be understood that the invention is in no sense limited thereby, and its scope is to be determined by that of the following claims:

What is claimed is:

1. A system for monitoring and locating objects on a planar surface comprising:
   a. at least three electromagnetic wave transmitter means for generating signals which diffuse around an object located on said planar surface, said transmitter means being located at three separate locations adjacent to said planar surface and positioned to cause the signals of at least three of said transmitter means to overlap,
   b. at least two electromagnetic wave receiver means placed at separate locations adjacent to said planar surface for receiving diffusion signals from said transmitter means which diffuse around an object located on said planar surface, wherein at least two of said receiver means receive said diffusion signals from at least three of said transmitter means to triangulate the location of stationary and moving objects on said planar surface, and
   c. computer means for receiving signals generated by said receiver means, said computer means having
      i. grid system means in said computer for storing signals generated by said receiver means when an object is placed on said planar surface at a plurality of selected locations on said planar surface stored in said grid system,
      ii. comparator means for comparing said grid system to signals generated by said two receiver means when an object is moving or stationary on said planar surface to locate the position of said object on said planar surface.

2. The system of claim 1 wherein said transmitter means transmit signals having a wavelength of from about 2000 angstroms to about three meters.

3. The system of claim 1 wherein said transmitter means transmit signals having a wavelength of from about 10 centimeters to about one meter.

4. The system of claim 1 wherein said system has monitor means connected to said computer means to display the location of the target.

5. The system of claim 1 wherein said planar surface is an airport runway.

6. A method for locating and tracking a target on a planar surface comprising:
   a. placing at least three electromagnetic wave transmitter for generating signals which diffuse around a target located on said planar surface, said transmitters being placed at three separate locations adjacent to said planar surface and positioned to cause the signals of at least three of said transmitters to overlap,
   b. generating signals from said three electromagnetic wave transmitters,
   c. receiving said signals by at least two electromagnetic wave receivers placed at two separate locations adjacent to said planar surface to receive said signals from said transmitters which diffuse around an object located on said planar surface, wherein at least two of said receivers receive said diffusion signals from at least three of said transmitters to triangulate the location of stationary and moving objects on said planar surface, said two receivers each generating an output signal, d. placing an object on said planar surface at a plurality of selected locations,
e. storing the signals received from said receivers at each of said selected locations in a computer to establish a grid system,
f. placing a target on said planar surface, and
g. continuously comparing said signals received from said receivers with said grid system to locate and track said target.

7. The method of claim 6 wherein the location of the target is displayed on a monitor.

8. The method of claim 6 wherein said planar surface is an airport runway.

9. A method for locating and tracking a target on a planar surface comprising:
   a. placing at least three electromagnetic wave transmitter for generating signals which diffuse around a target located on said planar surface, said transmitters being placed at three separate locations adjacent to said planar surface and positioned to cause the signals of at least three of said transmitters to overlap,
   b. generating signals from said three electromagnetic wave transmitters,
   c. receiving said signals by at least two electromagnetic wave receivers placed at two separate locations adjacent to said planar surface to receive said signals from said transmitters which diffuse around an object located on said planar surface, wherein at least two of said receivers receive said diffusion signals from at least three of said transmitters to triangulate the location of stationary and moving objects on said planar surface, said two receivers each generating an output signal,
   d. receiving signals generated from said receivers by a computer, said computer having a grid system therein for storing signals generated by said receivers when an object is placed on said planar surface at a plurality of selected locations on said planar surface stored in said grid system,
   e. placing a target on said planar surface,
   f. comparing said grid system to signals generated by said two receiver means when an object is moving or stationary on said planar surface to locate the position of said object on said planar surface.

10. The method of claim 9 wherein the location of the target is displayed on a monitor.

11. The method of claim 9 wherein the planar surface is an airport runway.

* * * * *